J. R. FLANNERY AND E. S. FITZ SIMMONS.
STAYBOLT STRUCTURE.
APPLICATION FILED DEC. 12, 1919.
1,400,736. Patented Dec. 20, 1921.
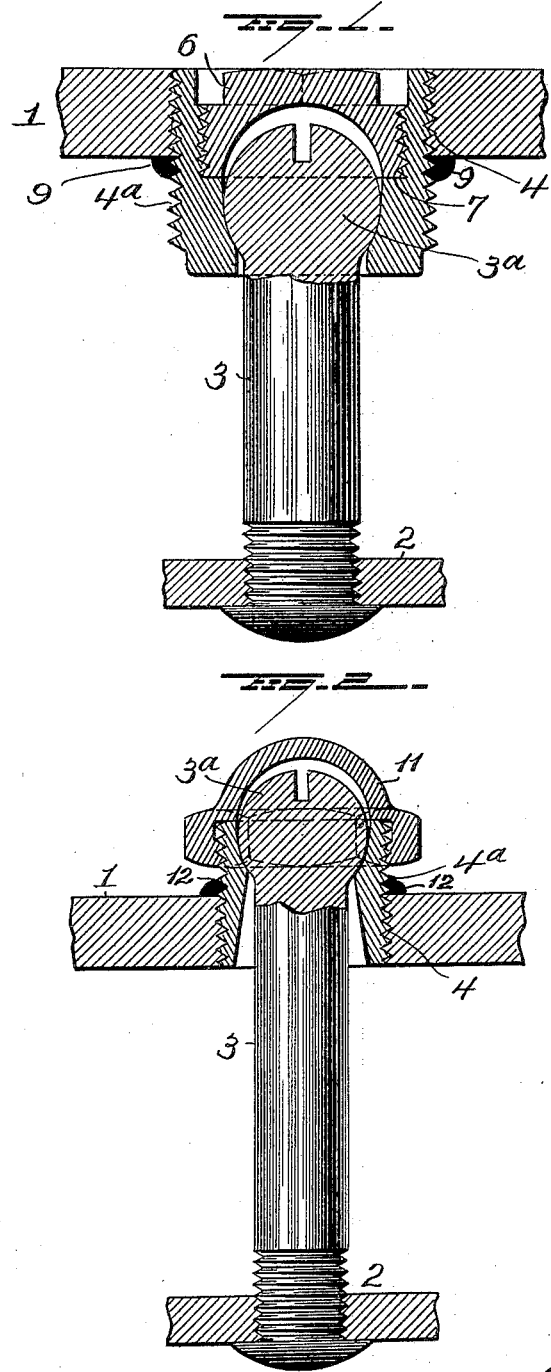

UNITED STATES PATENT OFFICE.

JOHN ROGERS FLANNERY AND EDWARD S. FITZ SIMMONS, OF PITTSBURGH, PENNSYLVANIA, ASSIGNORS TO FLANNERY BOLT COMPANY, OF PITTSBURGH, PENNSYLVANIA.

STAYBOLT STRUCTURE.

1,400,736.        Specification of Letters Patent.        Patented Dec. 20, 1921.

Application filed December 12, 1919. Serial No. 344,455.

*To all whom it may concern:*

Be it known that we, JOHN ROGERS FLANNERY and EDWARD S. FITZ SIMMONS, citizens of the United States, and residents of Pittsburgh, in the county of Allegheny and State of Pennsylvania, have invented certain new and useful Improvements in Staybolt Structures; and we do hereby declare the following to be a full, clear, and exact description of the invention, such as will enable others skilled in the art to which it appertains to make and use the same.

This invention relates to improvements in staybolt structures for boilers, and particularly to the manner of securing to the boiler sheet, the sleeves or bushings which constitute the bearing members for the heads of the bolts and the connection of the latter with the boiler sheet,—objects of my present invention being to provide means whereby a sleeve or bushing threaded through an opening in the boiler sheet shall become a homogenous part of the latter; to effectually prevent leakage past the threaded connection of the sleeve or bushing to the boiler sheet, and to reinforce the boiler sheet where the sleeve or bushing enters the same.

With these and other objects in view, the invention consists in certain novel features of construction and combination of parts as hereinafter set forth and pointed out in the claims.

In the accompanying drawings; Figure 1 is a sectional view (partly in elevation) of a staybolt structure embodying our improvements, wherein a "flush" sleeve or bushing is employed, and Fig. 2 is a similar view showing the application of my invention with a sleeve or bushing which projects outwardly beyond the outer face of the boiler sheet.

1 represents an outer boiler sheet and 2 the inner sheet of a boiler, the said inner sheet being provided with an opening through which the inner end of a staybolt 3 may be threaded and upset.

The outer boiler sheet 1 is provided with an opening having a threaded wall, as indicated at 4 and through this opening, an exteriorly threaded bearing sleeve or bushing 4ª is screwed. The sleeve or bushing 4ª is provided interiorly with a rounded or partly spherical seat 5 for the rounded head 3ª of the staybolt 3, and said sleeve or bushing is threaded interiorly for the reception of a plug or closure 6, and a shoulder 7 is formed within the sleeve or bushing to provide an abutment for said plug or closure. The plug or closure is made with a concave inner face whereby a clearance space 8 is provided for the bolt head.

In the embodiment of my invention shown in Fig. 1, the outer end of the bearing sleeve or bushing lies flush with the outer face of the outer boiler sheet 1 and when thus assembled, the sleeve or bushing will be integrally united to the inner face of the boiler sheet by a weld 9, the latter encircling the threaded exterior of said sleeve or bushing and uniting the latter to the inner face of the outer boiler sheet. In this way the sleeve and boiler sheet constitue a homogenous structure, reinforcing the boiler sheet and preventing leakage where the sleeve or bushing enters the boiler sheet. Furthermore, by welding the threaded sleeve or bushing to the boiler sheet, injury to the threads incident to calking as heretofore practised, is obviated.

In the embodiment of the invention shown in Fig. 2, an exteriorly threaded bearing sleeve or bushing which projects outwardly beyond the outer face of the boiler sheet 1, is shown,—said bearing sleeve or bushing being provided at its outer end with a threaded cap or closure 11. When this type of bearing sleeve or bushing is employed, it will be welded to the outer face of the boiler sheet by a weld 12 which surrounds the exteriorly threaded sleeve and renders the same an integral part of the boiler sheet.

Having fully described our invention what we claim as new and desire to secure by Letters-Patent, is:—

1. In a staybolt structure, the combination of a boiler sheet having an opening provided with a threaded wall, an exteriorly threaded bearing sleeve or bushing passing through said opening, a staybolt having a head mounted in said sleeve or bushing, and a weld uniting the threaded exterior of the sleeve or bushing to the boiler sheet, whereby the boiler sheet and sleeve form a homogenous structure and leakage past the threaded sleeve or bushing prevented.

2. In a staybolt structure, the combination of an outer boiler sheet having an opening provided with a threaded wall, an exteriorly threaded bearing sleeve or bushing passing through said opening, a staybolt having a head mounted in said sleeve or bushing, and a weld surrounding said exteriorly threaded sleeve or bushing and uniting the same integrally with the inner face of the outer boiler sheet.

In testimony whereof, we have signed this specification in the presence of two subscribing witnesses.

JOHN ROGERS FLANNERY.
EDWARD S. FITZ SIMMONS.

Witnesses:
JOHN M. RONEY,
JAMES R. HORAN.